(12) United States Patent
Paulzagade et al.

(10) Patent No.: US 8,433,689 B1
(45) Date of Patent: *Apr. 30, 2013

(54) SYSTEMS AND METHODS FOR RESTORING DEDUPLICATED DATA

(75) Inventors: Sudhakar Paulzagade, Roseville, MN (US); Xianbo Zhang, Madison, WI (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/462,367

(22) Filed: May 2, 2012

Related U.S. Application Data

(63) Continuation of application No. 12/572,532, filed on Oct. 2, 2009, now Pat. No. 8,204,862.

(51) Int. Cl.
*G06F 17/30* (2006.01)
(52) U.S. Cl.
USPC .......................................... 707/679; 707/692
(58) Field of Classification Search .................. None
See application file for complete search history.

(56) References Cited

U.S. PATENT DOCUMENTS

| | | | | |
|---|---|---|---|---|
| 6,021,408 | A * | 2/2000 | Ledain et al. | 707/823 |
| 7,567,188 | B1 * | 7/2009 | Anglin et al. | 341/63 |
| 7,870,105 | B2 * | 1/2011 | Arakawa et al. | 707/692 |
| 7,996,371 | B1 * | 8/2011 | Deshmukh | 707/692 |
| 2008/0243769 | A1 * | 10/2008 | Arbour et al. | 707/2 |
| 2008/0244172 | A1 * | 10/2008 | Kano | 711/112 |
| 2008/0244204 | A1 * | 10/2008 | Cremelie et al. | 711/162 |
| 2009/0013129 | A1 * | 1/2009 | Bondurant | 711/115 |
| 2009/0049260 | A1 * | 2/2009 | Upadhyayula | 711/162 |
| 2009/0319585 | A1 * | 12/2009 | Gokhale | 707/205 |
| 2010/0070478 | A1 * | 3/2010 | Anglin | 707/674 |
| 2010/0205389 | A1 * | 8/2010 | Kishi | 711/162 |
| 2010/0313040 | A1 * | 12/2010 | Lumb | 713/193 |

OTHER PUBLICATIONS

"Design and Implementation of Clustering File Backup Server Using File Fingerprint," by Sung et al. IN: Soft. Eng., Arti. Intel., Net. & Para./Distri. Comp., SCI 149, pp. 61-73 (2008). Available at: SpringerLink.*

"3DNBS: A Data De-duplication Disk-based Network Backup System," by Yang et al. IN: IEEE Int'l Conf. on Networking, Architecture and Storage (2009). Available at: IEEE.*

\* cited by examiner

*Primary Examiner* — Neveen Abel Jalil
*Assistant Examiner* — Daniel Kinsaul
(74) *Attorney, Agent, or Firm* — ALG Intellectual Property, LLC

(57) ABSTRACT

A method for restoring deduplicated data may include receiving a request to restore a set of deduplicated data segments to a client system, where each data segment in the set of deduplicated data segments is referred to by one or more deduplication references. The method may also include procuring reference data that indicates, for each data segment in the set of deduplicated data segments, the number of deduplication references that point to the data segment. The method may further include using the reference data to select one or more data segments from the set of deduplicated data segments for client-side caching, caching the one or more data segments in a cache on the client system, and restoring the one or more data segments from the cache on the client system. Various other methods, systems, and computer-readable media are also disclosed.

18 Claims, 5 Drawing Sheets

SYSTEMS AND METHODS FOR RESTORING DEDUPLICATED DATA

CROSS REFERENCE TO RELATED APPLICATION

This application is a continuation of U.S. application Ser. No. 12/572,532, filed 2 Oct. 2009, the disclosure of which is incorporated, in its entirety.

BACKGROUND

Client systems may store duplicate data for a variety of reasons. For example, client systems may store duplicate data to avoid accidental data removal. Client systems may also store multiple versions of a file to preserve the file's modification history, which typically results in storing duplicate data. As another example, database applications (e.g., ORACLE, SQL SERVER, etc.) may pre-allocate space for data files. In such situations, unused data file space may be generated using the same data patterns (e.g., unused data file space may be filled with zeros). Thus, database files (and backups of database files) may include a significant amount of duplicate data. As a third example, multiple virtual machines running on the same physical system may result in a significant amount of duplicate data being stored on the physical system.

Backup and archiving systems may implement deduplication to preserve storage space when backing up or archiving data from a client system. In such situations, the backed-up or archived data may be stored in a deduplication server. In a traditional deduplication system, a client system may retrieve all data from the deduplication server during a restoration process. A segment with ten duplicates on the client system may be stored as a single segment on the deduplication server but may be retrieved ten times from the deduplication server to restore client backup data. Retrieving the same data multiple times from the deduplication server may increase restoration time, consume extra network bandwidth, and create extra workload for the deduplication server. What is needed, therefore, is a more efficient process for restoring deduplicated data.

SUMMARY

As will be described in greater detail below, the instant disclosure generally relates to systems and methods for restoring deduplicated data. Embodiments of the instant disclosure may improve restoration efficiency for deduplicated data. For example, embodiments of the instant disclosure may implement client-side data caching to improve restoration efficiency. In some embodiments, a method may include receiving a request to restore a set of deduplicated data segments to a client system, where each data segment in the set of deduplicated data segments is referred to by one or more deduplication references. The method may also include procuring reference data that indicates, for each data segment in the set of deduplicated data segments, the number of deduplication references that point to the data segment. The method may further include using the reference data to select one or more data segments from the set of deduplicated data segments for client-side caching, caching the one or more data segments in a cache on the client system, and restoring the one or more data segments from the cache on the client system.

In certain embodiments, the method may include creating a mapping table of the one or more data segments. Creating the mapping table may include calculating a fingerprint for each of the one or more data segments and mapping the fingerprint of each of the one or more data segments to the content of each of the one or more data segments. Creating the mapping table of the one or more data segments may include creating the mapping table during a deduplication process, creating the mapping table during a data restoration process, and/or creating the mapping table based on deduplication metadata of a backup of the set of deduplicated data segments.

The method may include updating the mapping table by replacing the least-used deduplicated segment in the mapping table with a more-used deduplicated segment. Replacing the least-used deduplicated segment may include replacing the least-frequently used deduplicated segment and/or replacing the least-recently used deduplicated segment.

In some embodiments, caching the one or more data segments in the cache on the client system may include creating a pointer to at least one copy of a segment that has already been restored. According to various embodiments, caching the one or more data segments in the cache on the client system may be performed during a backup operation, an archiving operation, and/or a restoration operation.

According to various embodiments, a system for restoring deduplicated data may include at least one processor and an interface module programmed to direct the processor to receive a request to restore a set of deduplicated data segments to a client system, where each data segment in the set of deduplicated data segments is referred to by one or more deduplication references. The system may also include a selection module programmed to direct the processor to procure reference data that indicates, for each data segment in the set of deduplicated data segments, the number of deduplication references that point to the data segment. The selection module may also be programmed to use the reference data to select one or more data segments from the set of deduplicated data segments for client-side caching. The system may further include a cache module programmed to direct the processor to cache the one or more data segments in a cache on the client system and a restoration module programmed to direct the processor to restore the one or more data segments from the cache on the client system.

In some embodiments, the selection module may be programmed to create a mapping table of the one or more data segments. According to certain embodiments, creating the mapping table of the one or more data segments may include calculating a fingerprint for each of the one or more data segments and mapping the fingerprint of each of the one or more data segments to the content of each of the one or more data segments. Creating the mapping table of the one or more data segments may include creating the mapping table during a deduplication process, creating the mapping table during a restoration process, and creating the mapping table based on deduplication metadata of a backup of the set of deduplicated data segments.

According to certain embodiments, the selection module may be further programmed to update the mapping table by replacing the least-used deduplicated segment in the mapping table with a more-used deduplicated segment. In various embodiments, replacing the least-used deduplicated segment may include replacing the least-frequently used deduplicated segment and/or replacing the least-recently used deduplicated segment. According to at least one embodiment, the cache module may be programmed to cache the one or more data segments in the cache on the client system by creating a pointer to at least one copy of a segment that has already been restored. The cache module may be programmed to cache the one or more data segments in the cache on the client system during at least one of a backup operation and/or an archiving operation.

In certain embodiments, a computer-readable-storage medium may include one or more computer-executable instructions that, when executed by at least one processor of a computing device, cause the computing device to: (1) receive a request to restore a set of deduplicated data segments to a client system, wherein each data segment in the set of deduplicated data segments is referred to by one or more deduplication references; (2) procure reference data that indicates, for each data segment in the set of deduplicated data segments, the number of deduplication references that point to the data unit; (3) use the reference data to select one or more data segments from the set of data segments for client-side caching; (4) cache the one or more data segments in a cache on the client system; and (5) restore the one or more data segments from the cache on the client system.

The one or more computer-executable instructions may be further programmed to cause the computing device to create a mapping table of the one or more data segments. Additionally or alternatively, the one or more computer-executable instructions may be programmed to cause the computing device to create the mapping table of the one or more data segments by calculating a fingerprint for each of the one or more data segments and mapping the fingerprint of each of the one or more data segments to the content of each of the one or more data segments.

In some embodiments, the one or more computer-executable instructions may be programmed to cause the computing device to create the mapping table of the one or more data segments by creating the mapping table during a deduplication process, creating the mapping table during a data restoration process, and/or creating the mapping table based on deduplication metadata of a backup of the set of deduplicated data segments.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
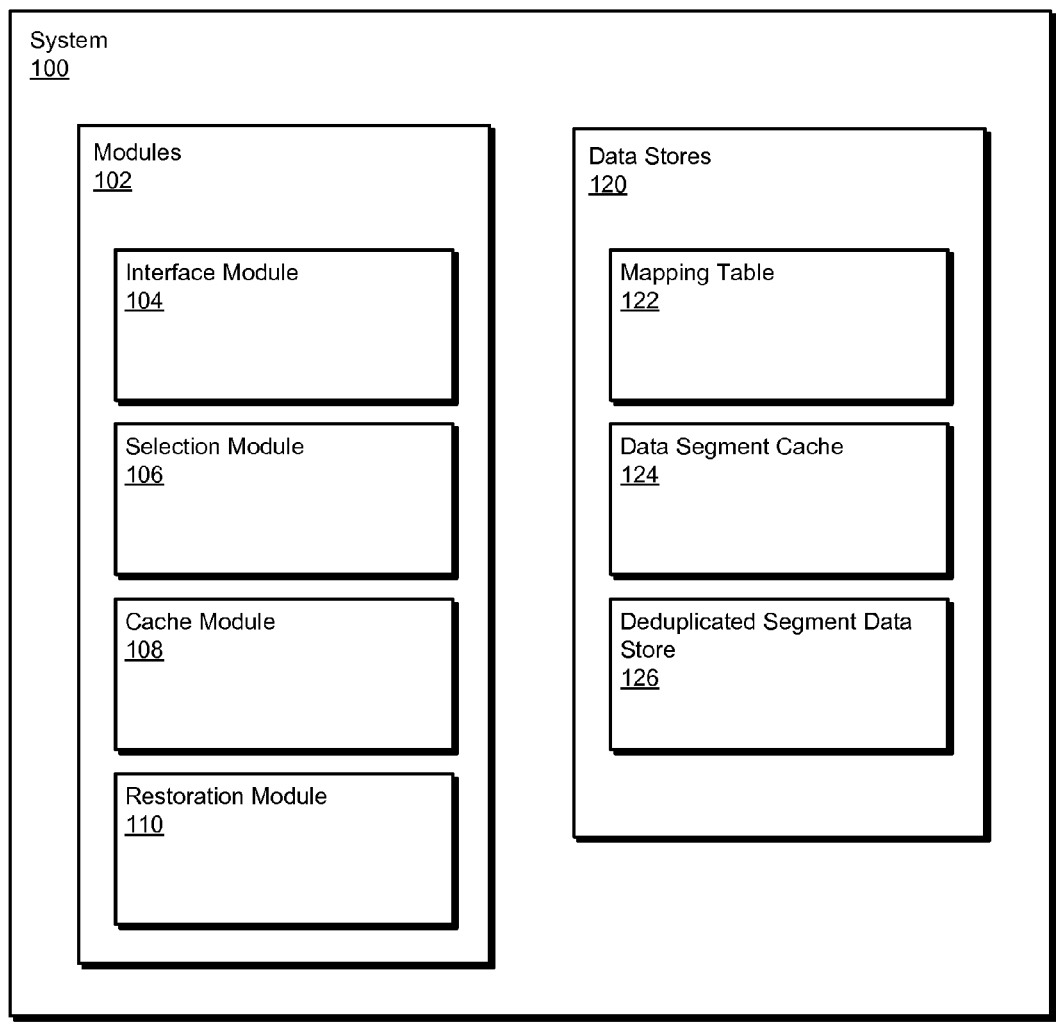
FIG. 1 is a block diagram of an exemplary system for restoring deduplicated data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for restoring deduplicated data. Embodiments of the instant disclosure may improve data restoration performance by leveraging client-side data duplicates. For example, a client may cache one or more data segments (e.g., the most reference segments) and may retrieve the cached data segments from a local cache rather than a remote data store during a restoration operation. Thus, during a restoration process, a client may only need to retrieve a deduplicated data segment from a deduplication server once. Embodiments, of the instant disclosure may reduce network traffic, deduplication server overhead, and/or may provide various other features and advantages.

Figure 2:
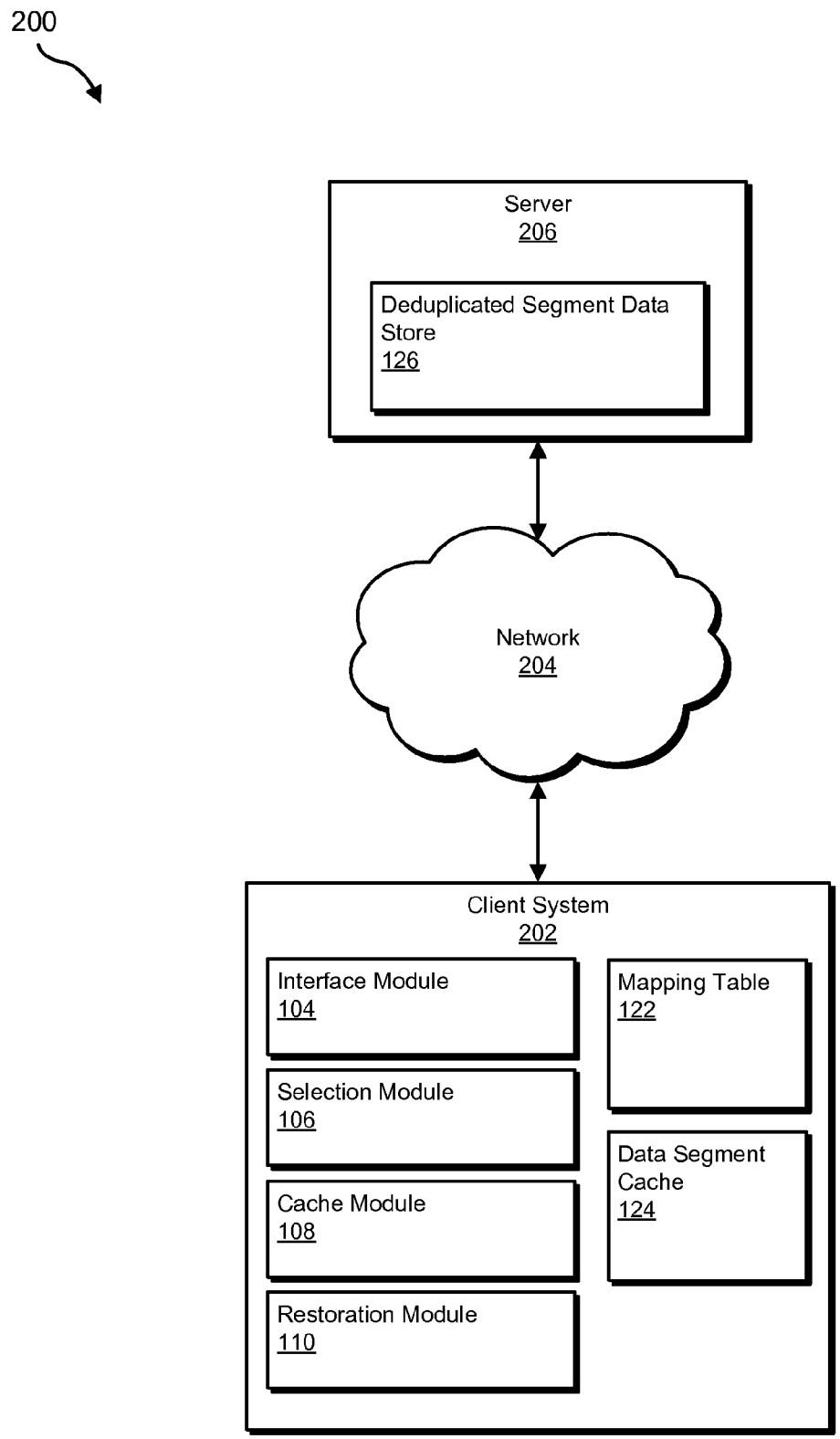
FIG. 2 is a block diagram of an exemplary system for restoring deduplicated data.

The following will provide, with reference to FIGS. 1-2, detailed descriptions of exemplary systems for restoring deduplicated data. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for restoring deduplicated data. As illustrated in this figure, exemplary system 100 may include one or more modules 102 for performing one or more tasks. For example, and as will be explained in greater detail below, exemplary system 100 may include an interface module 104 programmed to receive a request to restore a set of deduplicated data segments to a client system, where each data segment in the set of data segments is referred to by one or more deduplication references. Exemplary system 100 may also include a selection module 106 programmed to procure reference data that indicates, for each segment in the set of deduplicated data segments, the number of deduplication references that point to the data unit. Selection module 106 may also use the reference data to select one or more data segments from the set of data segments for client-side caching.

In addition, and as will be described in greater detail below, exemplary system 100 may include a cache module 108 programmed to cache the one or more selected data segments in a cache on the client system. Exemplary system 100 may also include a restoration module 110 programmed to restore the one or more selected data segments from the cache on the client system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., client system 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more data stores 120. Data stores 120 may represent portions of a single database or computing device or a plurality of databases or computing devices. In one embodiment, exemplary system 100 may include a mapping table 122 for mapping fingerprints of deduplicated data segments and content of deduplicated data segments. Exemplary system 100 may also include a data segment cache 124, which may store one or more data segments on a client system. Exemplary system 100 may further include a deduplicated segment data store 126 for storing one or more deduplicated data segments.

Data stores 120 in FIG. 1 may represent a portion of one or more computing devices. For example, data stores 120 may represent a portion of server 206 in FIG. 2, computing system 410 in FIG. 4, and/or portions of exemplary network architecture 500 in FIG. 5. Alternatively, data stores 120 in FIG. 1 may represent one or more physically separate devices capable of being accessed by a computing device, such as server 206 in FIG. 2 computing system 410 in FIG. 4 and/or portions of exemplary network architecture 500 in FIG. 5.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a client system 202 in communication with a server 206 via a network 204. Client system 202 may include interface module 104, selection module 106, cache module 108, restoration module 110, mapping table 122, and data segment cache 124. In other embodiments, one or more of the modules shown on client system 202 and/or all or a portion of the functionality of one or more of the modules shown on client system 202 may be located on server 206.

Client system 202 generally represents any type or form of computing device capable of reading computer-executable instructions. Examples of client system 202 include, without limitation, laptops, desktops, servers, cellular phones, personal digital assistants (PDAs), multimedia players, embedded systems, combinations of one or more of the same, exemplary computing system 410 in FIG. 4, or any other suitable computing device. In some situations, client system 202 may represent a backup or archiving server and server 206 may represent a deduplication system or appliance that deduplicates data backed up or archived by client system 202.

As shown in FIG. 2, server 206 may include deduplicated segment data store 126. Thus, server 206 may be a deduplication server. In some embodiments, server 206 may include or be part of a backup or archive system that backups or archives data from client system 202. Server 206 may also be any other type of system that stores data from client system 202 in deduplicated segment data store 226. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 500 in FIG. 5, or the like. Network 204 may facilitate communication or data transfer using wireless or wired connections. In one embodiment, network 204 may facilitate communication between client system 202 and server 206.

Figure 3:
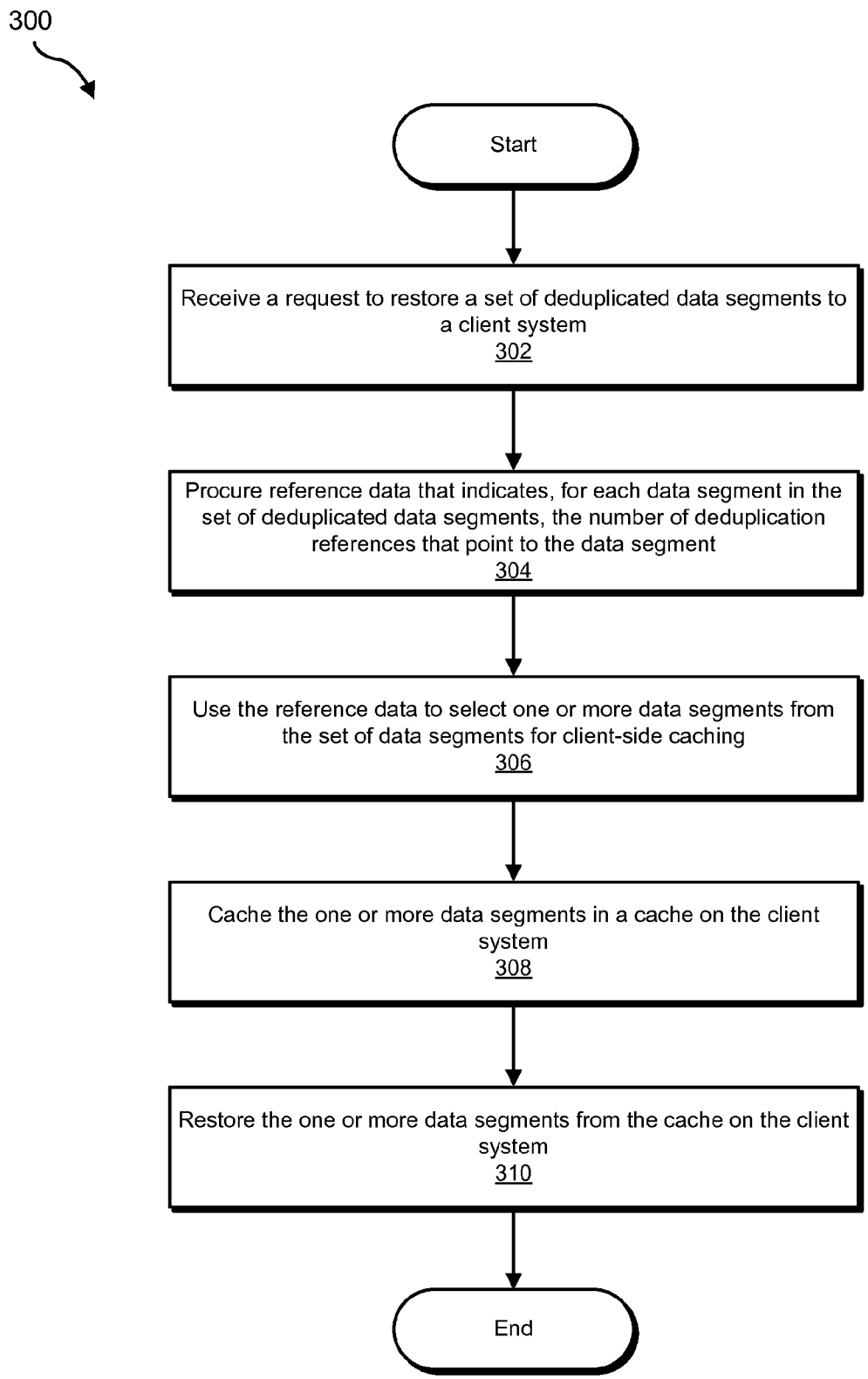
FIG. 3 is a flow diagram of an exemplary method for restoring deduplicated data.

FIG. 3 is a flow diagram of an exemplary computer-implemented method 300 for restoring deduplicated data. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2. At step 302 in FIG. 3, one or more of the systems described herein may receive a request to restore a set of deduplicated data segments to a client system, where each data segment in the set of data segments is referred to by one or more deduplication references. For example, interface module 104, as part of client system 202 and/or server 206, may receive a request to restore a set of deduplicated data segments to client system 202.

The request may be received in a variety of contexts. For example, interface module 104 may receive a request to restore backed up data segments to client system 202 after a failure that results in a data loss. In other embodiments, interface module 104 may receive a request to restore archived data segments to client system 202. Additionally or alternatively, the request may be received automatically after a set of data segments is deduplicated and/or in response to any other trigger.

As used herein, the phrase "data segment" may refer to any files, blocks, sectors, clusters, and/or any other unit of data. As used herein, the phrase "set of deduplicated data segments" generally refers to any set of one or more data segments that have been deduplicated. For example, a set of deduplicated data segments may include any set of one or more units of data that may be backed up or archived to server 206 and then deduplicated. Thus, in some embodiments, server 206 may represent and/or include a Single Instance Storage ("SIS") system. Server 206 may include one or more collections of single-instance data (i.e., deduplicated data), such as a single-instance database, for example. Deduplicated data may refer to data that has been deduplicated using any suitable deduplication technology or algorithm. For example, deduplicated data may refer to data that has been deduplicated using a process that reduces the amount of storage space used in a single-instance data storage system, including processes for detecting and preventing data from being redundantly stored to the single-instance data storage system.

At step 304 in FIG. 3, one or more of the systems described herein may procure reference data that indicates, for each data segment in the set of deduplicated data segments, the number of references that point to the data segment. For example, selection module 106 may procure reference data that indicates the number of references that point to each data segment in the set of deduplicated data segments. For example, selection module 106 may identify, calculate, or otherwise procure data that indicates the number of deduplication references that point to each data segment in the set of data segments. In some embodiments, selection module 106 may procure reference data by accessing meta-data and/or other information in a deduplication system, a backup catalog, and/or any other data source. Such information may then be used to calculate a reference count.

In some embodiments, reference data may be created on an as-needed basis. In other embodiments, reference data may be collected periodically or continually (i.e., as data is added to a deduplication system) and stored in a reference data database. In such embodiments, procuring reference data may include accessing the reference data in the database.

As used herein, the term "references" may refer to indexes, pointers, fingerprints, hashes, and/or any other information used by a deduplication system to identify data. For example, when an instance of a data segment is first stored in a deduplication system, the deduplication system may create a reference that identifies the data. If the data segment is part of a first backup, the deduplication system may store the data unit in a deduplication data store and may store the reference in a data object associated with the first backup.

The number of deduplication references that point to a data segment may be referred to herein as a reference count for the data segment. A reference count may be calculated in a variety of ways. For example, a reference count may be calculated by summing the number of data objects of a client device (e.g., client system 202) that point to the data segment. In some embodiments, the number of data objects that point to a data segment may include the number of original data objects that point to the data segment and/or the number of data object revisions that point to the data segment.

In some embodiments, a reference count may indicate the number of duplicate copies of a data segment represented in a deduplication system for a particular client device (e.g., the client on which one or more data segments may be cached). Deduplication systems may be used to backup data, archive data, and in a variety of other contexts where duplicate copies of data may need to be managed. For example, a deduplication system may receive a backup that includes hundreds of files and/or other data segments from client system 202. Some of the files in the backup may be duplicates. The deduplication system may store single instances of each of the files or other data segments in a deduplication data store and may create a data object that represents the backup. Instead of including the actual data of the backup, the data object that represents the backup may include references to the files or other data segments in the data store. While the deduplication data store may only store a single instance of a data segment that occurs multiple times in the backup, the data object that represents the backup may include a reference to the deduplicated data segment (i.e., the data segment in the data store) for each time the data segment occurs in the backup.

Continuing with the previous example, the deduplication data store may receive a second backup from client system 202. Some of the data segments in the second backup may be duplicates of data segments from the first backup. Thus, a data object that represents the second backup may include references to some of the same deduplicated data segments as the data object that represents the first backup.

As used herein, the phrase "data object" may refer to a collection of references that represent a set of data segment (e.g., a backup of a set of data segments, an archive of a set of data segments, etc.). Additionally or alternatively, the phrase "data object" may refer to a single reference to a data segment. Thus, each reference within a data object that represents a backup set may also be referred to as a data object. Therefore, a reference count that includes the number of data objects that point to the data segment may include the total number of individual references that point to the data segment, the total number of collections of references (i.e., data objects that represent sets of data segments) that include references that point to the data segment, or both.

As an example of a reference count that includes the number of individual references that point to a data segment, a deduplication system may include 25 references to a particular file. Thus, the reference count for the file may be 25. As an example of a reference count that includes the total number of collections of references that point to a data segment, a deduplication system may include ten data objects that represent ten different backups. Five of the ten backups may include references to a particular data segment. In this example, since the reference count is based on the total number of collections of references rather that the total number of references, the reference count for the particular data segment may only be five, even if some of the collections of references include multiple references to the data segment.

As a third example, a reference count may include the total number of individual references that point to the data segment and the total number of collections of references that point to the data segment. In this example, five collections of references may include individual references that point to the data segment. Two of the five collections may include only one reference to the data segment, and three of the five collections may include two references to the data segment. Thus, the total number of individual references to the data segment may be eight, and the total reference count may be thirteen (eight plus five).

Various other algorithms may also be used to calculate a reference count. For example, a reference count may differentiate between the number of original data objects that point to a deduplicated data segment and the number of data object revisions that point to a deduplicated data segment. The phrase "original data object" generally refers to a data object that represents a segment of a first version of a file or other data segment. The phrase "data object revision" generally refers to a data object that represents an unmodified segment of a revised version of a file or other data segment.

For example, a user may create a first file that is stored in two segments. The user may save a second version of the file, with the first segment remaining unchanged and the second segment being modified. The user may also save a third version of the file, with the first segment remaining unchanged and the second segment being modified again. A deduplication system may store three data objects that represent the three versions of the file, and each data object may include two references—a reference to the first segment of the file and a reference to the second segment of the file. In this example, the number of data object revisions that point to the first segment is three. Thus, a reference count that includes the number of data object revisions that point to a data segment would include these three references in a data count for the first segment. As described in greater detail below, differentiating between the number of data object revisions that point to a data segment and the number of other original data objects that point to a data segment may be useful in calculating weighted reference counts.

Procuring reference data (i.e., a reference count) for a data segment may include summing the number of original data objects that point to the data segment and/or the number of data object revisions that point to the data segment. The sum may be weighted or unweighted. As an example of an unweighted sum, three references of original data objects may point to a deduplicated data segment and five references of data object revisions may point to the deduplicated data segment. In this example, the reference count for the deduplicated data segment is eight.

In some embodiments, one or more components of a reference count may be weighted. For example, the number of original data objects that point to a data segment and/or the number of data object revisions that point to the data segment may be multiplied by a weight. Weighting one or more components of a reference count may be advantageous in a variety of situations. For example, in a single restore of all revisions to a large number of files, the number of data object revisions may be weighted higher than other components.

Weights for one or more components of a reference count may be configurable (i.e., configurable by a system administrator), hard coded, and/or variable. An example of a variable weight may be a weight that is based on a historical analysis of access patterns. Such a weight may vary over time. In some embodiments, selection module 106 may use historical reference data to select a subset of references that are more significant (e.g., references that point to data segments that may be accessed more frequently) than other references. Selection module 106 may multiply references in the subset of references by a higher weight than the other references. For example, references to data segments that are restored more frequently during a previous interval of time (e.g., over the previous month) may be weighted higher than references to a data unit that are restored less frequently. As another example, selection module 106 may use historical reference data to select a subset of references that point to a data unit that are more significant (e.g., data object revision references may be more significant if restorations of large numbers of file revisions are frequently performed) than other references that point to the data unit. The data-collection module may then multiply references in the subset of references by a higher weight than the other references that point to the data unit.

At step 306 in FIG. 3, one or more of the systems described herein may use the reference data to select one or more data segments from the set of data segments for client-side caching. For example, selection module 106 may use the reference data procured in step 304 to select data segments for client-side caching. Selection module 106 may select data segments with the highest reference count for client-side caching. For example, selection module 106 may select a predetermined number or percentage of data segments for client-side caching. Alternatively, selection module 106 may select all data segments with two or more references for client-side caching. Selection module 106 may also use any other parameter, algorithm, and/or heuristic to use the reference data to select data segments for client-side caching. For example, selection module 106 may select data segments that are most likely to be accessed in a restore for client-side caching. In such embodiments, selection module 106 may identify data segments with relatively high reference counts for client-side caching.

In some embodiments, the number of data segments selected by selection module 106 may be defined by the amount of space available on the client-side cache (e.g., data segment cache 224). For example, if client system 202 has 1 GB available for caching data segments in data segment cache 224, selection module 106 may use reference data to select 1 GB of data segments for relocation to the second device. In other embodiments, data segment cache 224 may store hashes of data segments and pointers to content that correspond to the hashes. In such embodiments, selection module 106 may use reference data to select 1 GB of hashes and pointers that correspond to data segments. Selection module 106 may additionally or alternatively use one or more other parameters to determine how many data segments are selected for client-side caching. In some embodiments, selection module 106 may select all data units with reference counts higher than a predetermined threshold for client-side caching.

At step 308 in FIG. 3, one or more of the systems described herein may cache the one or more selected data segments in a cache on the client system. For example, cache module 108 may cache selected data segments on client system 202. Cache module 108 may cache the data segments and/or may cache references to data segments that are stored elsewhere on client system 202. For example, cache module 108 may cache selected data segments on client system 202 by storing the data segments in volatile and/or non-volatile memory of the client system. Thus, data segment cache 224 on client system 202 may include volatile and/or non-volatile memory and may include one or more data segments.

As another example, cache module 108 may cache selected data segments by creating a mapping table (e.g., a table of pointers) in data segment cache 224 on client system 202 that references data segments that have already been restored. Thus, instead of or in addition to storing data segments, data segment cache 224 may store references to data segments. In other words, cache module 108 may cache data segments by storing references to the data segments in data segment cache 224. For example, for each data segment in the data segments selected by selection module 106, selection module 106 may calculate a fingerprint for the data segment and map the fingerprint of the data segment to the content of the data segment. In some embodiments, selection module 106 may use deduplication metadata from a backup of the deduplicated data to create the mapping table. The mapping table may include any data structure, list, or other storage mechanism for tracking cached data segments. In some embodiments, the mapping table may be created while the data segments are being deduplicated (e.g., the mapping table may be a persistent mapping table that is continually updated). In other embodiments, the mapping table may be created during a data restoration process (e.g., the mapping table may be created on the fly).

Selection module 106 may maintain and update the mapping table. For example, selection module 106 may update the mapping table by replacing the least-used deduplicated segment referenced in the mapping table with a more-used duplicate segment. In some embodiments, selection module 106 may replace the least-frequently used deduplicated data segment. Selection module 106 may determine how frequently a data segment is used in any suitable manner. For example, selection module 106 may determine how frequently a data segment is used by determining how often the data segment is accessed (e.g., read, modified, etc.) in a given period of time. In other embodiments, selection module 106 may replace the least-recently used deduplicated data segment. Selection module may determine how recently a data segment has been used may accessing "date accessed" metadata associated with the data segment.

Cache module 108 may cache the one or more selected data segments in a variety of contexts. For example, cache module 108 may cache the one or more selected data segments during a backup or archiving operation. Alternatively, cache module 108 may cache the one or more selected data segments during a restoration operation.

At step 310 in FIG. 3, one or more of the systems described herein may restore the one or more data segments from the cache on the client system. For example, restoration module 110 may restore one or more data segments from data segment cache 224 on client system 202 instead of restoring the one or more data segments from server 206. For example, if data segment cache 224 store the data segments themselves, restoration module 110 may retrieve the data segments from data segment cache 224. In embodiments where data segment cache 224 store references to data segments, restoration module 110 may access data segment cache to determine where the data segments are stored on client system 202 and may retrieve the data segments from the locations referred to in data segment cache 224.

In some embodiments, restoration module 110 may restore a first instance of a data segment from server 206 and may cache the first instance of the data segment in data segment cache 124 on client system 202. When subsequent instances of the data segment need to be restored to client system 202, restoration module 210 may retrieve the data segment from data segment cache 124 or may query data segment cache 124 to determine where the data segment is stored on client system 202. In other embodiments, a data segment may be cached on client system 202 before the restoration operation begins (e.g., client system 202 may continually maintain a cache of data segments) and restoration module 210 may not need to retrieve the data segment from server 206. In such embodiments, restoration module 210 may retrieve the data segment from the cache each time the data segment is needed during a restore operation, including the first time the data segment is needed during the restore operation.

Figure 4:
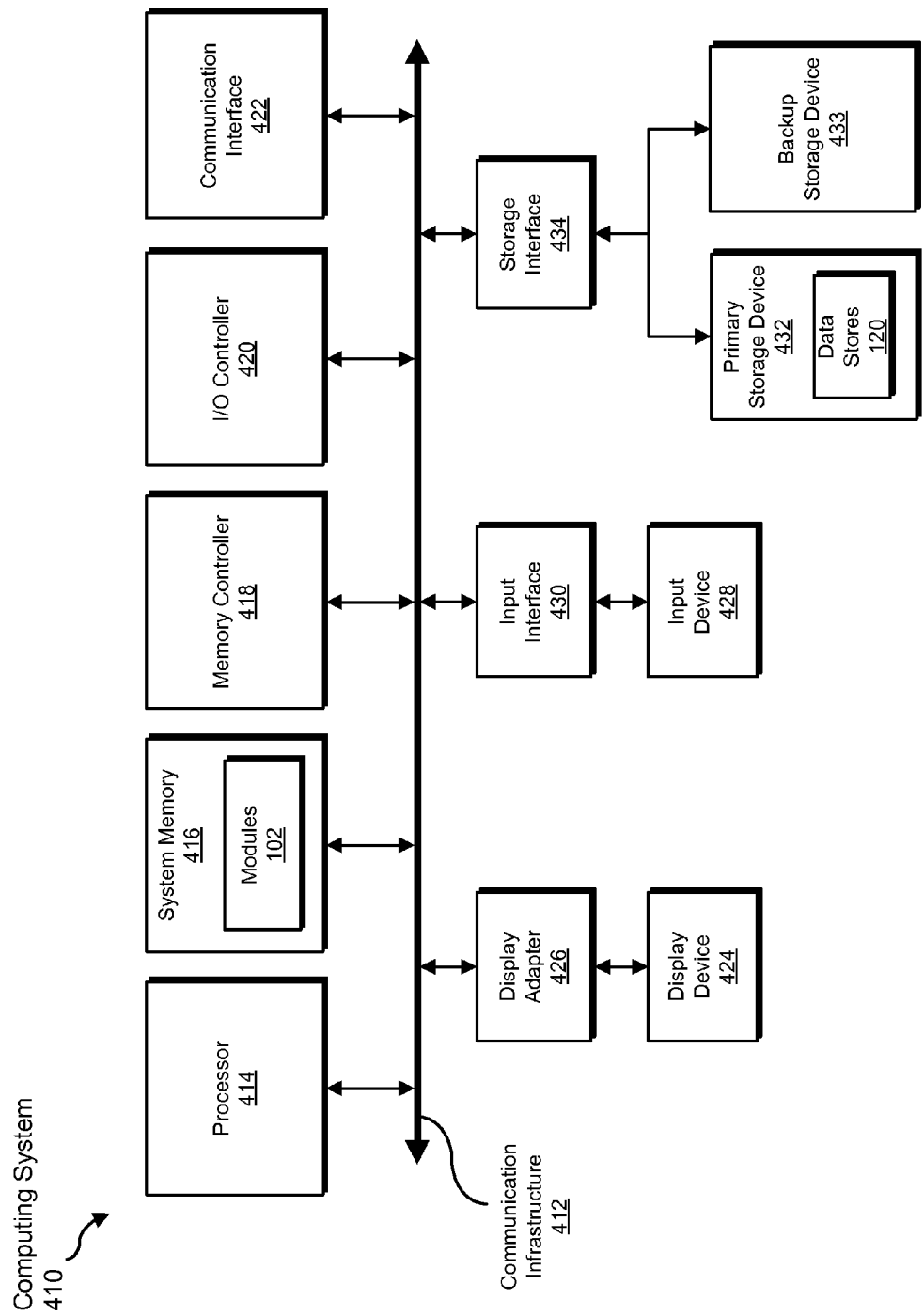
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the receiving, procuring, using, caching, restoring, creating, calculating, mapping, and replacing steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller may perform and/or be a means for performing, either alone or in combination with other elements, one or more of the steps or features described and/or illustrated herein, such as receiving, procuring, using, caching, restoring, creating, calculating, mapping, and replacing.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the receiving, procuring, using, caching, restoring, creating, calculating, mapping, and replacing steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the receiving, procuring, using, caching, restoring, creating, calculating, mapping, and replacing steps disclosed herein. Communication interface 422 may also be used to perform and/or be a means for performing other steps and features set forth in the instant disclosure.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the receiving, procuring, using, caching, restoring, creating, calculating, mapping, and replacing steps disclosed herein. Input device 428 may also be used to perform and/or be a means for performing other steps and features set forth in the instant disclosure.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. In one example, data stores 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, storage devices 432 and 433 may be used, for example, to perform and/or be a means for performing, either alone or in combination with other elements, one or more of the receiving, procuring, using, caching, restoring, creating, calculating, mapping, and replacing steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
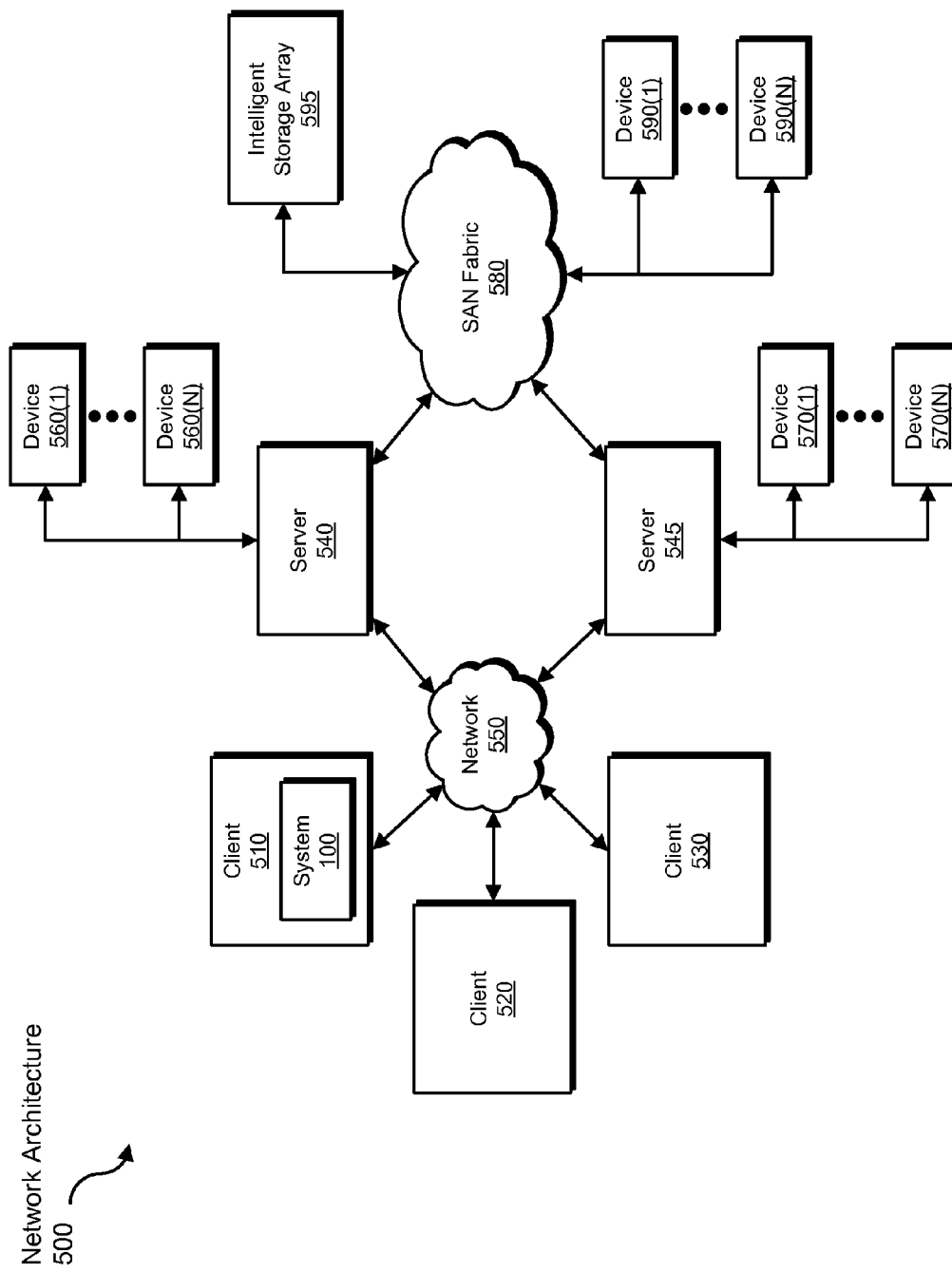
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. In one example, client system 510 may include system 100 from FIG. 1.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590 (1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the receiving, procuring, using, caching, restoring, creating, calculating, mapping, and replacing steps disclosed herein. Network architecture 500 may also be used to perform and/or be a means for performing other steps and features set forth in the instant disclosure.

As detailed above, computing system 410 and/or one or more components of network architecture 500 may perform and/or be a means for performing, either alone or in combination with other elements, one or more steps of an exemplary method for restoring deduplicated data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, data may be scanned, from, and/or to a cloud computing environment and/or one or more of modules 102 may operate in a cloud computing environment.

In addition, one or more of the modules described herein may transform data, physical devices, and/or representations of physical devices from one form to another. For example, one or more of the modules described herein may transform a client device into a restoration device by caching data segments for restoration on the client device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for restoring deduplicated data, at least a portion of the method being performed by a computing device comprising at least one processor, the method comprising:
    receiving a request to restore a set of deduplicated data segments to a client system, wherein each data segment in the set of deduplicated data segments is referred to by one or more deduplication references;

procuring reference data that indicates, for each data segment in the set of deduplicated data segments, a number of deduplication references on the client system that point to the data segment, wherein the number of deduplication references that point to the data segment comprises a total count of how many individual deduplication references, collections of deduplication references, or both, point to the data segment;

using the reference data to select one or more data segments from the set of deduplicated data segments for client-side caching;

caching at least one of the one or more data segments or references to the one or more data segments in a cache on the client system;

restoring the one or more data segments from the client system wherein restoration comprises at least one of restoring the one or more data segments from the cache on the client system or querying the cache to determine where the one or more data segment are stored on the client system.

2. The computer-implemented method of claim 1, further comprising:
creating a mapping table of the one or more data segments.

3. The computer-implemented method of claim 2, wherein creating the mapping table of the one or more data segments comprises:
calculating a fingerprint for each of the one or more data segments;
mapping the fingerprint of each of the one or more data segments to the content of each of the one or more data segments.

4. The computer-implemented method of claim 2, wherein creating the mapping table of the one or more data segments comprises at least one of:
creating the mapping table during a deduplication process;
creating the mapping table during a data restoration process;
creating the mapping table based on deduplication metadata of a backup of the set of deduplicated data segments.

5. The computer-implemented method of claim 2, further comprising: updating the mapping table by replacing a least-used deduplicated segment in the mapping table with a more-used deduplicated segment.

6. The computer-implemented method of claim 5, wherein replacing the least-used deduplicated segment comprises at least one of:
replacing a least-frequently used deduplicated segment;
replacing a least-recently used deduplicated segment.

7. The computer-implemented method of claim 1, wherein caching the one or more data segments in the cache on the client system comprises creating a pointer to at least one copy of a segment that has already been restored.

8. A system for restoring deduplicated data, the system comprising:
at least one processor;
an interface module programmed to direct the processor to receive a request to restore a set of deduplicated data segments to a client system, wherein each data segment in the set of deduplicated data segments is referred to by one or more deduplication references;
a selection module programmed to direct the processor to:
procure reference data that indicates, for each data segment in the set of deduplicated data segments, a number of deduplication references on the client system that point to the data segment, wherein the number of deduplication references that point to the data segment comprises a total count of how many individual deduplication references, collections of deduplication references, or both, point to the data segment;
use the reference data to select one or more data segments from the set of deduplicated data segments for client-side caching;
a cache module programmed to direct the processor to cache at least one of the one or more data segments or references to the one or more data segments in a cache on the client system;
a restoration module programmed to direct the processor to restore the one or more data segments from the client system wherein restoration comprises at least one of restoring the one or more data segments from the cache on the client system or querying the cache to determine where the one or more data segments are stored on the client system.

9. The system of claim 8, wherein procuring the reference data comprises:
summing a number of data objects on the client system that point to the data segment to procure a count of how many deduplication references point to the data segment.

10. The system of claim 9, wherein;
the number of data objects that point to the data segment comprises a count of how many original data objects point to the data segment plus a count of how many data object revisions point to the data segment;
the original data objects comprise data objects that represent first versions of data segments;
the data object revisions comprise data objects that represent revised versions of data segments.

11. The system of claim 9, wherein the number of data objects that point to the data segment comprises a count of a total number of collections of references that point to the data segment, wherein each collection of the collections of references comprises a plurality of data objects that represent sets of data segments.

12. The system of claim 8, wherein procuring the reference data comprises:
weighting one or more components of the reference count to provide a weighted sum of deduplication references that point to the data segment.

13. The system of claim 8, wherein the selection module is programmed to use the reference data to select one or more data segments from the set of deduplicated data segments for client-side caching by selecting data segments whose reference counts are higher than a predetermined threshold for client-side caching.

14. The system of claim 8, wherein:
the selection module is programmed to use the reference data to select one or more data segments from the set of deduplicated data segments for client-side caching by selecting a predetermined number of data segments whose reference counts are high relative to data segments that were not selected for client-side caching;
the predetermined number of data segments is defined by an amount of space available on the cache on the client system.

15. A non-transitory computer-readable-storage medium comprising one or more computer-executable instructions that, when executed by at least one processor of a computing device, cause the computing device to:
receive a request to restore a set of deduplicated data segments to a client system, wherein each data segment in the set of deduplicated data segments is referred to by one or more deduplication references;
procure reference data that indicates, for each data segment in the set of deduplicated data segments, a number of deduplication references on the client system that point to the data segment, wherein the number of deduplication references that point to the data segment comprises a total count of how many individual deduplication references, collections of deduplication references, or both, point to the data segment;

use the reference data to select one or more data segments from the set of deduplicated data segments for client-side caching;

cache at least one of the one or more data segments or references to the one or more data segments in a cache on the client system;

restore the one or more data segments from the client system wherein restoration comprises at least one of restoring the one or more data segments from the cache on the client system or querying the cache to determine where the one or more data segments are stored on the client system.

16. The non-transitory computer-readable-storage medium of claim 15, wherein the one or more computer-executable instructions are further programmed to cause the computing device to create a mapping table of the one or more data segments.

17. The non-transitory computer-readable-storage medium of claim 16, wherein the one or more computer-executable instructions are programmed to cause the computing device to create the mapping table of the one or more data segments by:

calculating a fingerprint for each of the one or more data segments;

mapping the fingerprint of each of the one or more data segments to the content of each of the one or more data segments.

18. The non-transitory computer-readable-storage medium of claim 16, wherein the one or more computer-executable instructions are programmed to cause the computing device to create the mapping table of the one or more data segments my performing at least one of:

creating the mapping table during a deduplication process;

creating the mapping table during a data restoration process;

creating the mapping table based on deduplication metadata of a backup of the set of deduplication data segments.

\* \* \* \* \*

UNITED STATES PATENT AND TRADEMARK OFFICE
CERTIFICATE OF CORRECTION

PATENT NO. : 8,433,689 B1
APPLICATION NO. : 13/462367
DATED : April 30, 2013
INVENTOR(S) : Sudhakar Paulzagade and Xianbo Zhang It is certified that error appears in the above-identified patent and that said Letters Patent is hereby corrected as shown below:

In the Claims:

Claim 1, at column 17, lines 15 to 20, should read:

restoring the one or more data segments from the client system wherein restoration comprises at least one of restoring the one or more data segments from the cache on the client system or querying the cache to determine where the one or more data segments are stored on the client system.

Claim 7, at column 17, lines 50 to 53, should read:

The computer-implemented method of claim 1, wherein caching the at least one of the one or more data segments or references to the one or more data segments in the cache on the client system comprises creating a pointer to at least one copy of a segment that has already been restored.

Claim 18, at column 20, lines 11 to 15, should read:

The non-transitory computer-readable-storage medium of claim 16, wherein the one or more computer-executable instructions are programmed to cause the computing device to create the mapping table of the one or more data segments by performing at least one of:

Signed and Sealed this
Twenty-fourth Day of September, 2013

Teresa Stanek Rea
*Deputy Director of the United States Patent and Trademark Office*